Oct. 6, 1959 S. E. MAYER ET AL 2,907,885

MAGNETIC CONTROL CIRCUIT

Filed April 4, 1955

Inventor
S. E. MAYER-
J. M. WADDELL
By [signature]
Attorney

United States Patent Office 2,907,885

Patented Oct. 6, 1959

2,907,885

MAGNETIC CONTROL CIRCUIT

Simon Ernst Mayer and James Maclagan Waddell, London, England, assignors to International Standard Electric Corporation, New York, N.Y.

Application April 4, 1955, Serial No. 499,194

Claims priority, application Great Britain April 9, 1954

3 Claims. (Cl. 250—212)

This invention relates to magnetic control circuits and utilises the known property of a germanium P–N junction that it has rectifying properties and also acts as an electrical valve in the reverse rectification direction, the valve opening in response to light and/or infra-red rays impinging on the edge of the junction.

According to the invention, there is provided a magnetic control circuit responsive to variation in intensity of illumination which comprises an inductive element having a rectangular hysteresis loop characteristic and a germanium P–N junction photocell in series therewith and arranged in series with a pair of alternating current input terminals and a pair of output load terminals.

The invention also comprises a magnetic control system comprising a magnetic control circuit as described in the previous paragraph, connected at its input terminals to a source of alternating current and at its output terminals to a load circuit, and provided with means for illuminating the photocell in varying amounts as required.

A useful application of such control circuits is to light-controlled servo-mechanism, and the invention, therefore, further comprises a liquid level controller comprising a magnetic control circuit as described above and in which the level of the liquid in a transparent vessel acts as a light shutter for the photocell and a servo-mechanism responds to adjust the level of the liquid in the said vessel.

The invention will now be more particularly described with reference to the accompanying drawing illustrating a preferred embodiment, together with a practical application in a servo-mechanism.

Figures 1, 2, 3:
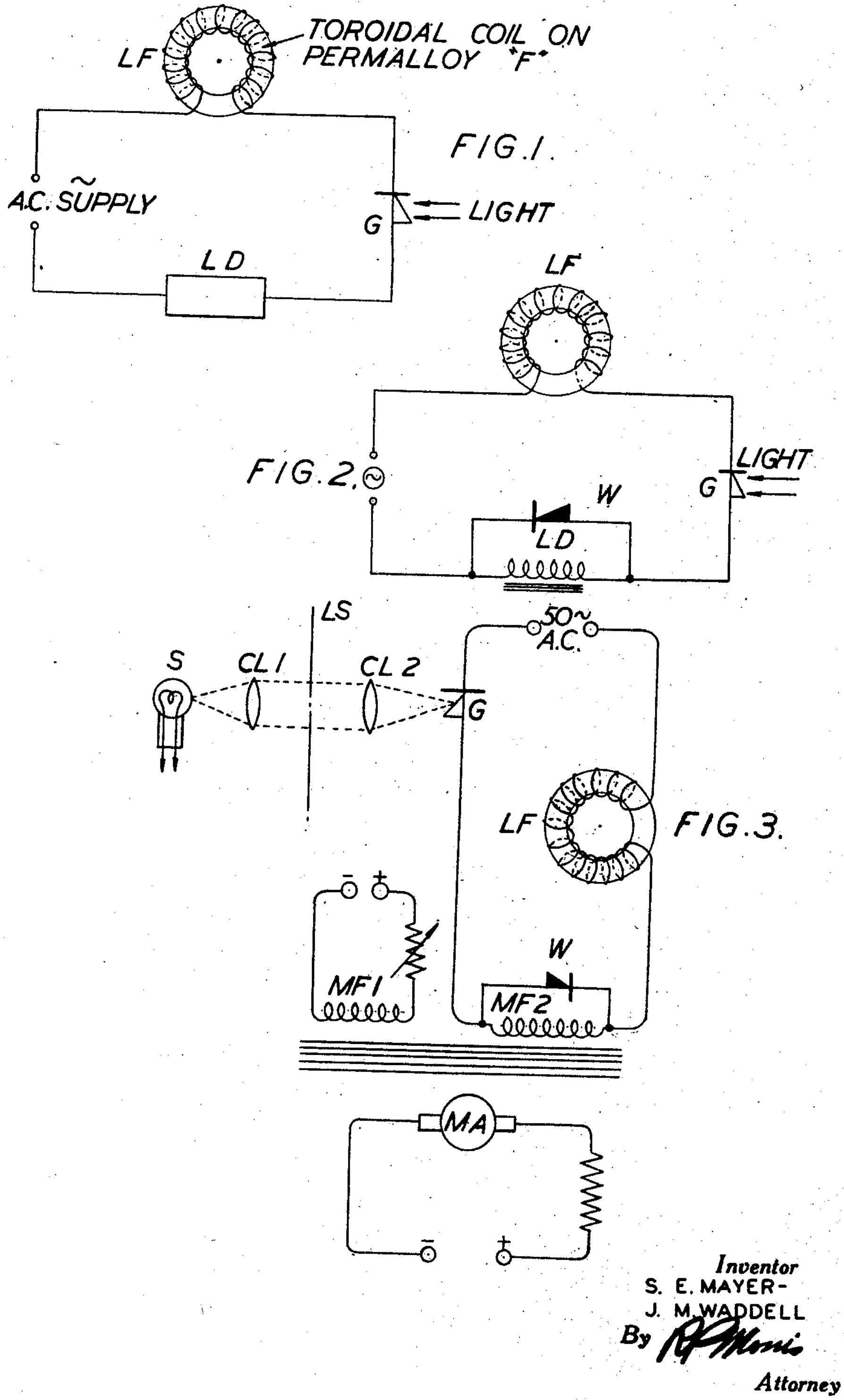
Fig. 1 illustrates a control circuit employing a germanium junction-type photocell as a controlling element.
Fig. 2 is a similar circuit having an inductive load.
Fig. 3 shows the application in a servo-mechanism.

In U.S. Patent No. 2,749,488, the construction of a germanium junction type power rectifier and photocell has been described. The output power of such a photocell is limited by the maximum reverse voltage which the cell will withstand and the maximum reverse current which can be obtained by illuminating the cell, and this power may be of the order 50–100 milliwatt. The value of load resistance required to achieve this maximum power is very high, and inconveniently so for a load, such as a relay coil, requiring the use of very fine wires to realise it.

The present circuit arrangement utilises the larger current handling capacity of the photocell when biased in the forward direction, increasing the available power, and reducing the load resistance required for maximum output power, each by a factor of ten or more.

In Fig. 1, a load LD, a germanium junction photocell G and a toroidal core inductance LF, consisting of a single winding on a core of Permalloy "F" or similar material, are connected in series with an A.C. supply circuit. Permalloy "F" is a type of magnetic material having a rectangular hysteresis loop, exhibiting a sharp transition between negligible magnetisation and saturation.

When the photocell is illuminated, it behaves in the circuit as a relatively low resistance in either direction (up to a certain value of current flow), and the coil LF and the supply voltage are so arranged that the core does not quite reach saturation so that the magnetising current which flows is very small, less than the limiting current referred to above.

When the illumination is removed, however, the photocell behaves as a rectifier, and the resultant direct current produced by the rectifying action flows in the coil in one direction only, causing the core to saturate. The impedance of LF is therefore effectively destroyed and removed from the circuit, which now behaves as a half-wave rectifier with its load.

The maximum output of the system is only limited by the maximum reverse voltage and maximum forward current which the photocell will withstand, and is thus much larger than the direct output of the cell itself when used in the conventional manner with reverse bias only. For the photocell referred to, it can be of the order 500–750 milliwatts.

Intermediate states can be obtained with partial saturation and current flow, so that the arrangement constitutes a linear amplifier.

If the load circuit is inductive, such as a relay coil or motor field winding, a rectifier W should be connected across it to smooth the current flow and increase its effective value. The arrangement is illustrated in Fig. 2.

Fig. 3 illustrates the use of the arrangement of Fig. 2 in a servo-mechanism, where the effect controlled is the amount of light from a source of illumination S falling on to a photocell G in a magnetic control circuit including a field winding of a D.C. servo-motor.

A shutter LS in the path of the light between condenser lenses CL1 and CL2 is moveable up and down vertically on a lead screw (not shown) driven by a D.C. servo-motor MA. When the shutter is high, the illumination reaching the photocell is much reduced, rectification of the 50 cycles per second alternating current from the source takes place, and coil LF saturates, so that a heavy current flows in field winding MF2 of the split-field servo-motor, which has a separately excited armature, MA, as shown.

The motor drives the lead screw in a direction to lower the shutter so that more light reaches the photocell and the control output is reduced. A steady bias current derived separately and flowing in the other half MF1 of the split-field winding provides a permanent magnetic bias for the motor and is such as to drive the lead screw in the reverse direction and the control output is therefore controlled by the position of the shutter to a value where the effects due to the two field windings balance, and the motor comes to rest.

A particular application of this device is in liquid level control where the shutter would be constituted by the level of the liquid in a transparent vessel, light passing freely above the level and being absorbed by the liquid below the level. In this application, the motor would be coupled to a means controlling the level of the liquid in the vessel.

Other applications of this invention are in the fields of alarm and recording as applied to manufacturing and testing.

While the principles of the invention have been described above in connection with specific embodiments, and particular modifications thereof, it is to be clearly understood that this description is made only by way of example and not as a limitation on the scope of the invention.

What is claimed is:

1. A magnetic control circuit, comprising an inductive element having a core of magnetic material, a light sensitive device in series with said element, said device having normally a high impedance to flow of current in one direction and a low impedance to flow of current in the opposite direction, and when subjected to illumination said device having a relatively low impedance to the flow of current in either direction, and a source of alternating current in series with said device and said element, the value of alternating current being selected so that when the impedance of said device is relatively low as a result of illumination, the inductive element does not saturate and when the impedance of said device is unidirectional the rectified alternating current is sufficient to saturate said element, whereby the amplitude of current traversing said circuit is controlled by illumination of said light sensitive device.

2. A magnetic control circuit, according to claim 1, wherein said light sensitive device comprises a P–N junction photocell, and further comprising means for illuminating the photocell in predetermined varying amounts as required.

3. The magnetic control circuit, according to claim 1, wherein said inductive element comprises a magnetic core having a rectangular hysteresis loop characteristic and a winding thereon in series with said device and said alternating current source.

References Cited in the file of this patent

UNITED STATES PATENTS

| | | |
|---|---|---|
| 2,164,728 | Wey | July 4, 1939 |
| 2,274,530 | Collins | Feb. 24, 1942 |
| 2,314,822 | Quesada | Mar. 23, 1943 |
| 2,504,628 | Benzer | Apr. 18, 1950 |
| 2,519,339 | Avery | Aug. 22, 1950 |
| 2,567,896 | Semm | Sept. 11, 1951 |
| 2,570,978 | Pfann | Oct. 9, 1951 |